United States Patent

Takahashi

[11] Patent Number: 5,861,693
[45] Date of Patent: Jan. 19, 1999

[54] POWER-GENERATING ELECTRIC MOTOR

[76] Inventor: Yoshiaki Takahashi, Room No. 206 Arisukawa Residence, 14-1, 5-chome, Minatoku Tokyo, Japan

[21] Appl. No.: 559,938

[22] Filed: Nov. 17, 1995

[30] Foreign Application Priority Data

Sep. 28, 1995 [JP] Japan .................................. 7-274951

[51] Int. Cl.⁶ .......................... H02K 47/04; H02K 21/12
[52] U.S. Cl. .......................................... 310/113; 310/156
[58] Field of Search ................................... 310/156, 261, 310/187, 113

[56] References Cited

U.S. PATENT DOCUMENTS

| | | | |
|---|---|---|---|
| 4,237,394 | 12/1980 | Aoki | 310/113 |
| 4,237,395 | 12/1980 | Loudermilk | 310/113 |
| 4,482,830 | 11/1984 | Iwaki et al. | 310/113 |
| 4,658,167 | 4/1987 | Popov et al. | 310/156 |
| 4,720,662 | 1/1988 | Lanser | 318/138 |
| 4,942,322 | 7/1990 | Raybould et al. | 310/156 |
| 5,359,248 | 10/1994 | Nagate et al. | 310/156 |
| 5,408,165 | 4/1995 | Voet | 318/523 |

*Primary Examiner*—Nestor Ramirez
*Assistant Examiner*—Michael J. Wallace, Jr.
*Attorney, Agent, or Firm*—David J. Archer

[57] ABSTRACT

A power-generating electric motor (1) which is very excellent in the energy efficiency and capable of taking out an electric energy for a prolonged period of time, which motor comprises a rotor (2) made of a permanent magnet; an armature (11) disposed coaxially with the rotor (2) with an air gap therebetween and comprising a suitable number of field cores (13) provided each with a field coil (12); and a brushless control circuit, characterized by a high $BH_{max}$ permanent magnet (8) disposed inside the base portion of each magnet pole (5) of the rotor (2) and an induction coil (15) for an electric power generation disposed adjacent each of the field coils (12) of the armature (11).

14 Claims, 7 Drawing Sheets

FIG. 1

| Symbol | Magnet | Magn. flux density Br (KG) | Coercive force Hc (KOe) | Max. energy prod. BHmax (MGOe) |
|---|---|---|---|---|
| A | Nd−Fe−B | 12.5 | 11 | 36 |
| B | Co−Fe−Y | 11.1 | 6.6 | 31 |
| C | Alnico | 11.6 | 0.7 | 10 |
| D | Ferrite | 4.0 | 2.8 | 4.6 |

FIG. 2
Demagnetization Curve for CoFeY + FeNdB

POWER-GENERATING ELECTRIC MOTOR

FIELD OF THE INVENTION

The present invention relates to a power-generating electric motor which is very excellent in the energy efficiency.

BACKGROUND OF THE INVENTION

Electric motor which converts an electric energy into a mechanical energy exhibits in general, due to an electromagnetic loss, such as the so-called iron loss by the hysteresis and eddy current in the iron core, and due to a mechanical loss by friction and vibration, not much better conversion efficiency. In order to maintain the motor operation, electric power enough to compensate such conversion loss should be supplied successively.

Heretofore, attempts have been proposed for increasing the conversion efficiency by, for example, improvement of the circuits included in the electric instruments and of the material of magnetic elements and by elimination or reduction of friction-causing portions, whereby nevertheless no satisfactory result has been attained.

One of the essential causes therefor resides in that there is a limitation in the characteristics of the permanent magnet indispensable for an electric rotary machine, such as motor or generator.

Figure 1:
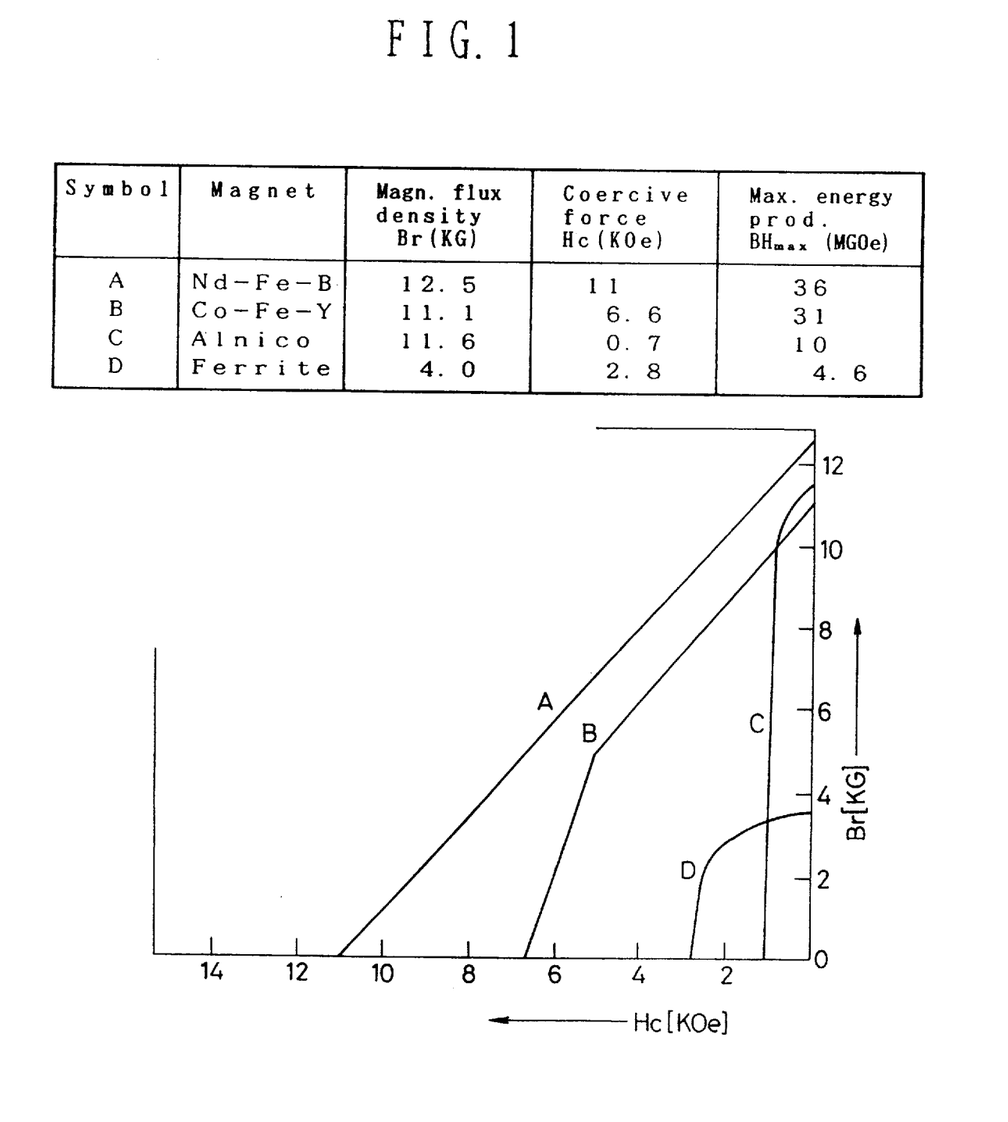
FIG. 1 is a graph showing the demagnetization curve for a conventional magnet material.
Figure 2:
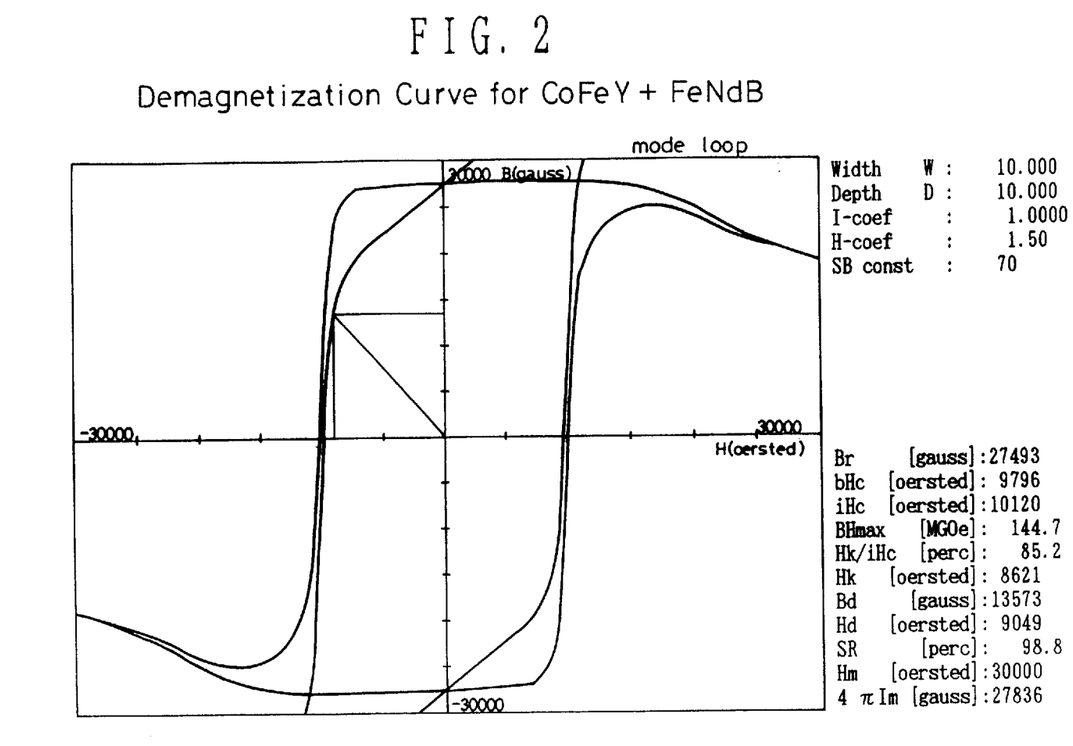
FIG. 2 is a graph showing the demagnetization curve for a high $BH_{max}$ permanent magnet, according to the present invention.

At present, the magnetic material exhibiting the highest magnetic energy product $BH_{max}$ (B=magnetic flux density, H=magnetic coercive force) is that of neodium iron magnet (Nd—Fe—B) which has a $BH_{max}$ value in the order of 36 MGOe. However, this magnetic material has a low Curie point and an inferior temperature characteristic of the magnetic flux density. This material is disadvantageous in the point that the coercive force is low, as seen from the demagnetization curve A of FIG. 1, in which the magnetic flux density decreases in proportion to the magnetic field strength. With such a magnetic material, a sufficient conversion efficiency cannot be achieved.

If the $BH_{max}$ value is high and the permeance coefficient is large, it means in itself that there is preserved a large amount of energy convertible into an electric energy or into a mechanical energy. Thus, if a magnetic material has a high $BH_{max}$ value combined with a large permeance coefficient, its magnetization becomes more difficult and a considerable amount of energy will be consumed for the magnetization, so that it can be assumed that a magnet with a high $BH_{max}$ value and a large permeance coefficient possesses in itself an amount of magnetic energy corresponding to that required for its magnetization.

Therefore, it would have been able to realize an electric motor or a power-generating motor which exhibits a very high energy efficiency, if the magnetic energy accumulated in a magnetic material as mentioned above was able to be utilized effectively. Thus, it was not a mere dream to realize a power-generative motor which can attain a long-term driving with a power regeneration by a lower energy input, if a permanent magnet having a sufficiently high $BH_{max}$ value combined with a large permeance coefficient (hereinafter denoted simply as a "high $BH_{max}$ permanent magnet") were provided. Nevertheless, such a magnet material had not been discovered.

SUMMARY OF THE INVENTION

An object of the present invention is to provide a power-generating electric motor of very high efficiency using a high $BH_{max}$ permanent magnet in a part of the permanent magnet of the rotor, which can afford to take out an electric power excessively and effectively.

In particular, the present invention aims at a power-generating electric motor which can permit a long-lasting self-running by only supplying it with a starting power input and which realizes an efficient storage of electric power, by employing a special permanent magnet having a $BH_{max}$ value of at least 50 MGOe, preferably at least 100 MGOe, and a permeance coefficient of 1.0 to 4.0, preferably 2.5 to 3.5, in a form of, for example, a duplex structure with an inner layer magnet of Co—Fe—Y and an outer layer magnet of Fe—Nd—B. By the present invention, it is also contemplated to provide an electric motor necessitating a lower power consumption by omitting the induction coil from the above-mentioned motor.

Thus, it is contemplated by the present invention to provide a very efficient power-generating electric motor permitting generation of an electric power, which comprises a rotor of a permanent magnet; an armature arranged coaxially with the rotor with an air gap interposed therebetween and including a suitable number of field cores provided each with a field coil; and a brushless control circuit, by making use of a high $BH_{max}$ permanent magnet mentioned above, characterized in that the high $BH_{max}$ permanent magnet is disposed inside each magnet pole of the rotor so as to extend in the axial direction of the rotor and that an induction coil for power generation is arranged together with the field coil of the rotor.

DETAILED DESCRIPTION OF THE INVENTION

In the power-generating motor according to the present invention, the rotor of a permanent magnet is made of a multilayered iron core composed of a rotary shaft and a magnetic material mounted on the shaft. Here, the magnetic material may have a $BH_{max}$ value within the usual range. The number of magnet poles of the rotor are not restricted specifically and it may be in a 2-, 4- or 6-polar arrangement.

The rotor is designed in a form of a cylinder, wherein the entire circumference of the rotor may be in a uniform arcuate curve, while it is preferable to design the rotor in a form in which each magnetic pole protrudes outwards in a form of a ridge. Within the base portion of this ridge of the magnet pole, a cut-off groove or canal extending in the axial direction of the rotor is provided for receiving a correspondingly shaped high $BH_{max}$ permanent magnet.

In the context of the present invention, the high $BH_{max}$ permanent magnet should have a $BH_{max}$ value of at least 50 MGOe, preferable at least 100 MGOe and a permeance coefficient of 1.0 to 4.0, preferably 2.5 to 3.5.

An embodiment of the magnet which satisfies the above condition is constructed, as mentioned previously, by combining an inner layer magnet of Co—Fe—Y with an outer layer magnet of Fe—Ne—B, while other magnets and magnet combinations may also be employed therefor so long as the above condition is satisfied.

Thus, the electric motor according to the present invention is characterized in that a high $BH_{max}$ permanent magnet is used as a part of the iron core of the rotor without deteriorating the motor efficiency.

The polarity of the high $BH_{max}$ permanent magnet coincides with that of the ridged pole. While there is no limitation in the configuration of the high $BH_{max}$ magnet, it takes preferably a flat form. Here, it is preferable that the flat high $BH_{max}$ magnet is disposed inside the base portion of the ridge of the rotor magnet pole to extend within a cut-off canal almost over the entire width of the ridge with only a small uncutted rest or margin at each side end of the cut-off canal. The outer circumference of the ridge of the magnet pole may be shaped in a uniform arc surface, while it is preferable to cut a part of one side thereof into a plane surface.

Surrounding the ridged magnet poles of the rotor, a stationary armature having a suitable number of field cores each provided with a field coil is disposed coaxially with the rotor with an air gap therebetween. It is preferable that each field core has a cut-off pierced canal in parallel to the axis of the rotor for receiving therein a high $BH_{max}$ permanent magnet.

The power-generating motor according to the present invention has a brushless control circuit. By the brushless circuit, every control mechanism without employing any brush is included, wherein an MR element, Hall-element, lead switch, magnetic diode, magnetic transistor or so on is used as a magnetic sensor, of which output is used for controlling the excitation of the field coil to rotate the rotor.

The motor according to the present invention is characterized in that a more energy generation is attained by the use of the high $BH_{max}$ permanent magnet and a part of this energy is taken out as an electric energy. For this, an induction coil for taking out the electric energy is arranged together with each field coil of the armature. It is preferable to dispose the induction coil at a position as near as possible to the field coil.

If the installation of the induction coil is omitted, the arrangement can be used as a motor as such.

It is preferable to connect the induction coil with a condenser in parallel thereto, which causes tuning of the coil circuit to the frequency of the current generated at a lower revolution rate of the rotor, such as 500–800 r.p.m., whereby an electric power can be taken out effectively even at a lower revolution rate.

The motor according to the present invention operates in such a manner that a voluntary magnet pole of the rotor is caused to be attracted to a field core at certain position by energizing the field coil therefor, while detecting the passage of the magnet pole of the rotor by the field core using a magnetic sensor, the output signal of which is supplied to a control circuit to cause excitation of the next field coil and, at the same time, the deactivation of the preceding field coil. By repeating such a sequence of operations, the rotor is rotated and corresponding mechanical energy is taken out from its rotary shaft.

Due to the arrangement of an induction coil for generating an electric power adjacent each field coil of the armature, an induction current is generated in the induction coil when a magnetic pole of the rotor passes by the coil, which can be taken out as an electric power.

A high $BH_{max}$ permanent magnet having a $BH_{max}$ value at least 50 MGOe, preferably at least 100 MGOe is mounted at each magnet pole of the rotor. The magnet flux density of the high $BH_{max}$ permanent magnet is so high that the induction energy generated upon passage of the induction coil through the magnet flux is vary large and, therefore, the rotor continues to be driven by the electric energy which is taken out of the induction coil and stored in the magnet, once a starting power input has been supplied.

PREFERRED EMBODIMENT OF THE INVENTION

Below, the power-generating electric motor according to the present invention is described in more detail by way of an example with reference to the appended Drawings.

Figure 3:
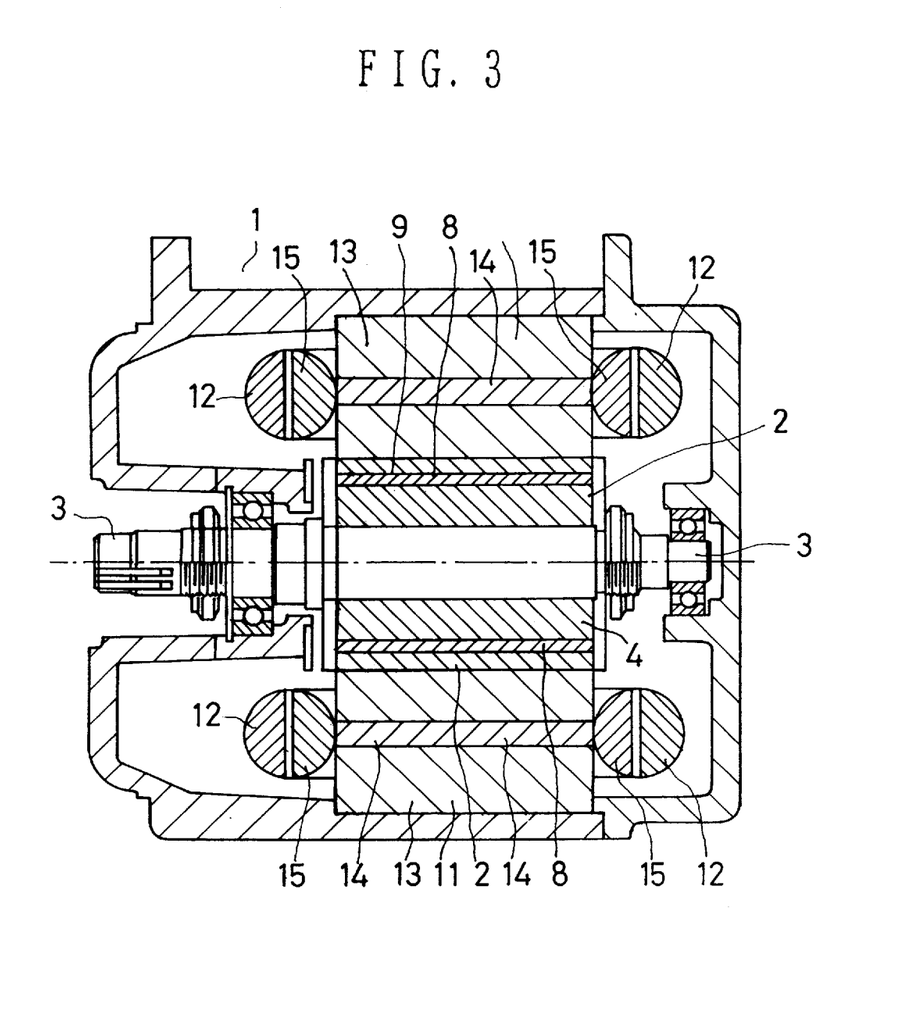
FIG. 3 shows an embodiment of the power-generating electric motor according to the present invention in an axial section.

Referring now to FIGS. 3 ff., the power-generating motor according to the present invention includes a housing 1 and a rotor 2 composed of a rotary shaft 3 and an iron core 4. The iron core 4 consists of a permanent magnet with its magnet poles being formed each as a ridge 5, of which outer circumference has an arc surface 6 and a plane surface 7.

Figure 4:
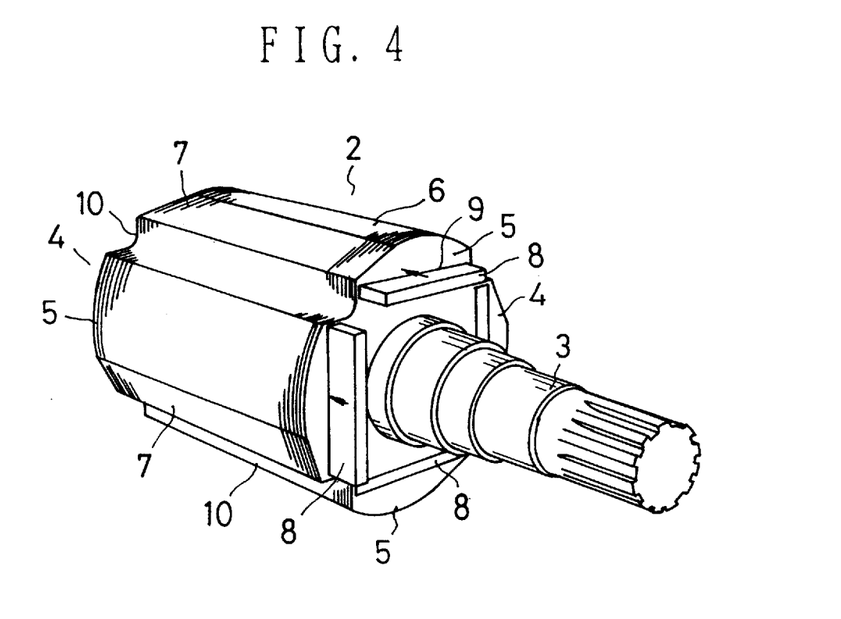
FIG. 4 is a perspective view of the rotor of the motor of FIG. 3.
Figure 5:
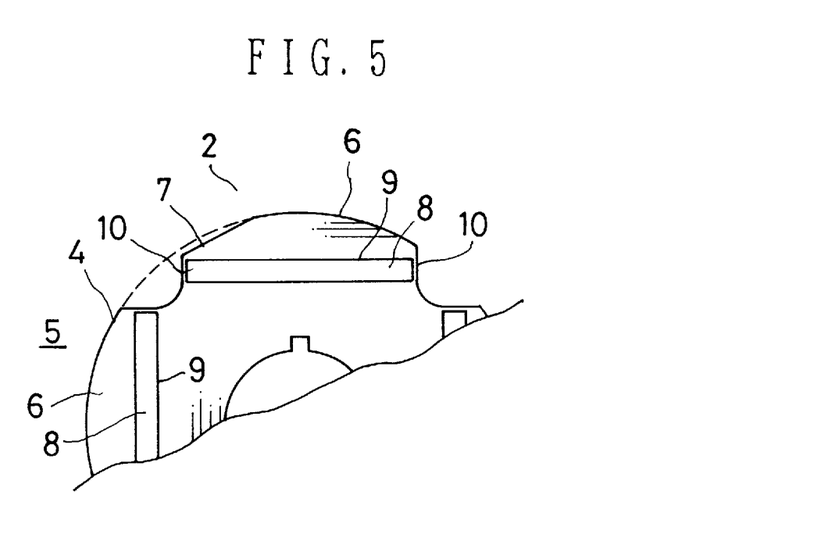
FIG. 5 shows the rotor of FIG. 4 in a partial enlarged front view.

A flat high $BH_{max}$ permanent magnet 8 is inserted in the cut-off canal 9 extending axially inside the base portion of each ridge 5 of the iron core of the rotor 2. This high $BH_{max}$ permanent magnet had a $BH_{max}$ value of 144.7 MGOe and a permeance coefficient of 3 and was formed in a duplex structure composed of an inner layer magnet of Co—Fe—Y and an outer layer magnet of Fe—Nd—B.

The cut-off canal 9 receives the flat permanent magnet 8 and is formed extending almost over the entire width of the ridge 5 with only a small uncutted margin 10 at each side end.

An armature 11 comprising a suitable number of field cores 13 each provided with a field coil 12 is arranged coaxially with the rotor 2. In each field core 13, a flat high $BH_{max}$ permanent magnet 14 is insertedly disposed, as in the iron core 4 of the rotor.

An induction coil 15 is arranged adjacent each of the field coils 12 and is excited upon the rotation of the rotor 2.

Figure 6:
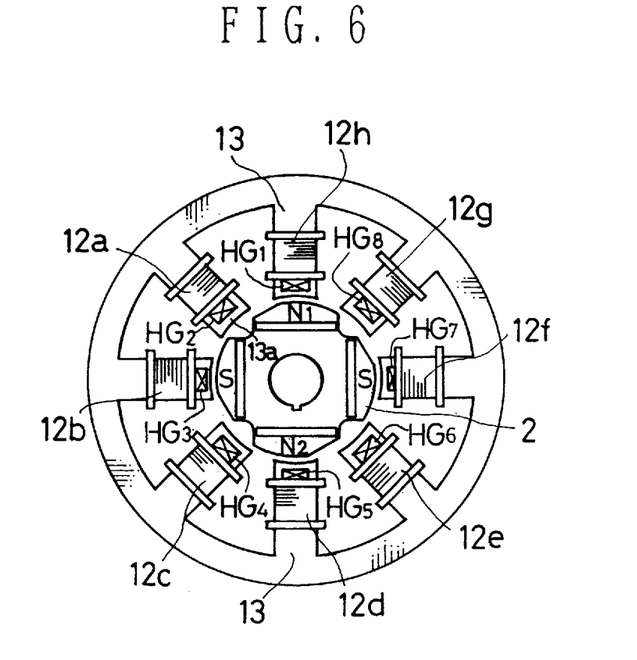
FIG. 6 shows an embodiment of arrangement of the brushless control circuit in the motor according to the present invention.
Figure 7:
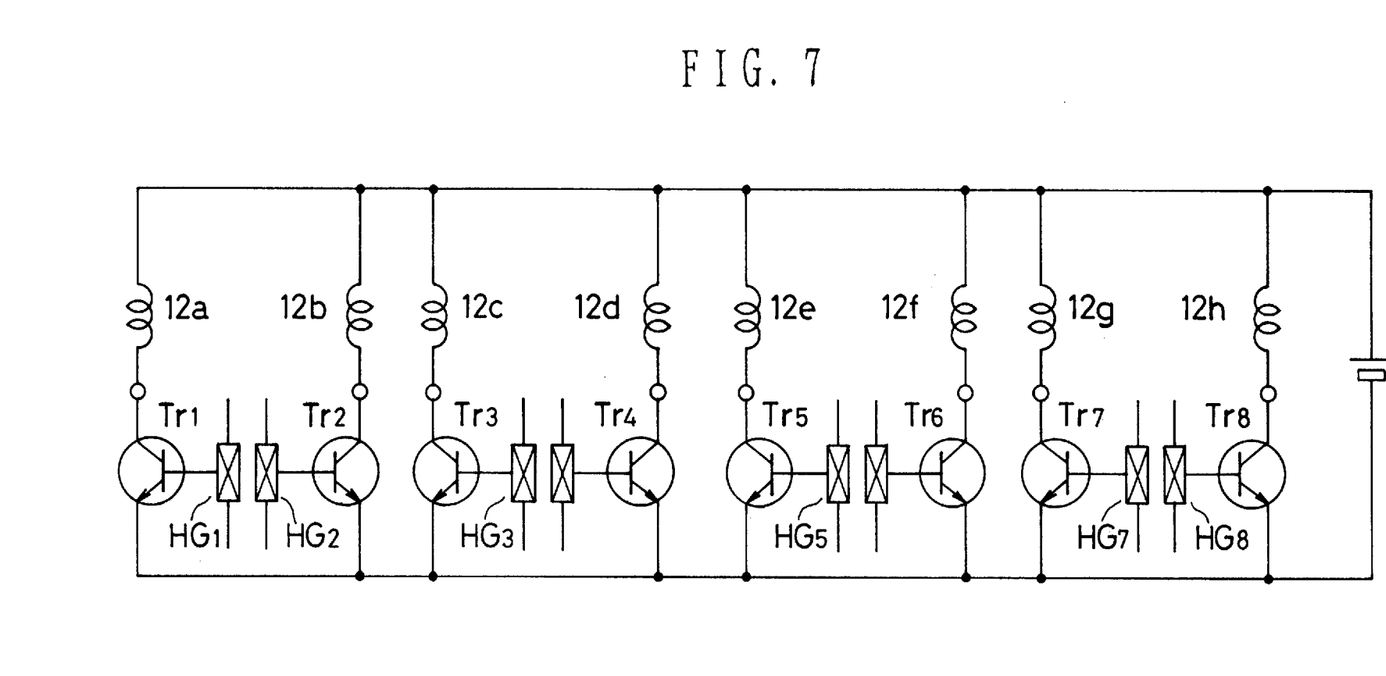
FIG. 7 shows an embodiment of construction of the brushless control circuit.

FIGS. 6 and 7 show the mechanical structure and the arrangement of the brushless control circuit, respectively, wherein each of the field coils 12a to 12h is provided with a Hall-element of HG1 to HG8.

If the magnet pole N1 of the rotor is in the position shown in FIG. 6, the Hall-element HG1 will generate an output signal, which causes the potential of the base of the transistor Tr1 to decrease to thereby excite the field coil 12a to cause the iron core 13a to assume as S-pole which attracts the magnet pole N1 of the rotor 2 to rotate it to a position opposing the field coil 12a. Here, the base potential of the transistor TR1 is faded off by the extinction of the excitation current in the field coil 12a due to the moving away from the magnet pole N1, whereby the field core 13 becomes inactive towards the magnet pole N1. When the magnet pole N1 reaches the position opposing the Hall-element HG2 at the field coil 12a, an electric signal is given out of the Hall-element HG2 which causes the transistor Tr2 to be actuated to excite the field coil 12b to cause the iron core 13 therefor to assume as S-pole which attracts the magnet pole N1 of the rotor 2 to further rotate it. Such an action is performed also with respect to the magnet pole N2 of the rotor 2.

In this manner, by arranging a Hall-element HGat a position accessible by a magnet pole N of the rotor 2, the field coil existing at the directly subsequent position in the direction of rotation of the rotor is excited successively upon the rotation of the rotor to assume the corresponding iron core as S-pole, whereby the rotor is rotated without using a brush.

In addition, the induction coil 15 disposed adjacent the field coil 12 of the armature 11 is excited upon the rotation of the rotor 2 to generate an electric power.

Figure 8:
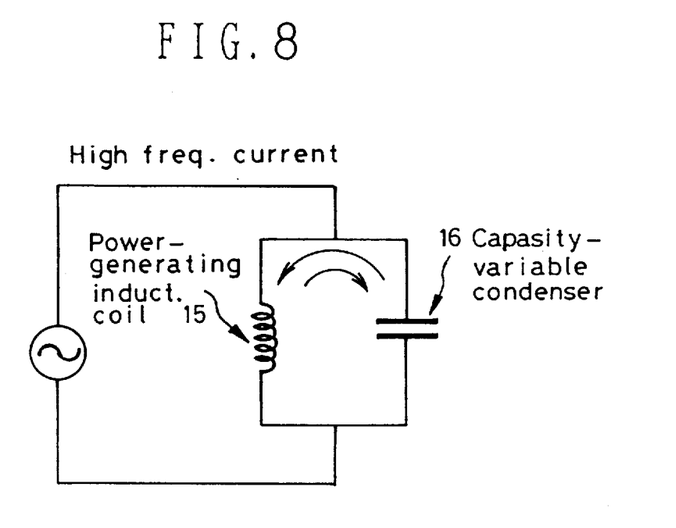
FIG. 8 is a wiring chart of the induction coil in which the induction coil is connected parallel with a variable condenser.

FIG. 8 shows the case in which a variable capacity condenser 16 is inserted in the field coil circuit in parallel connection with the field coil 15.

Figure 9:
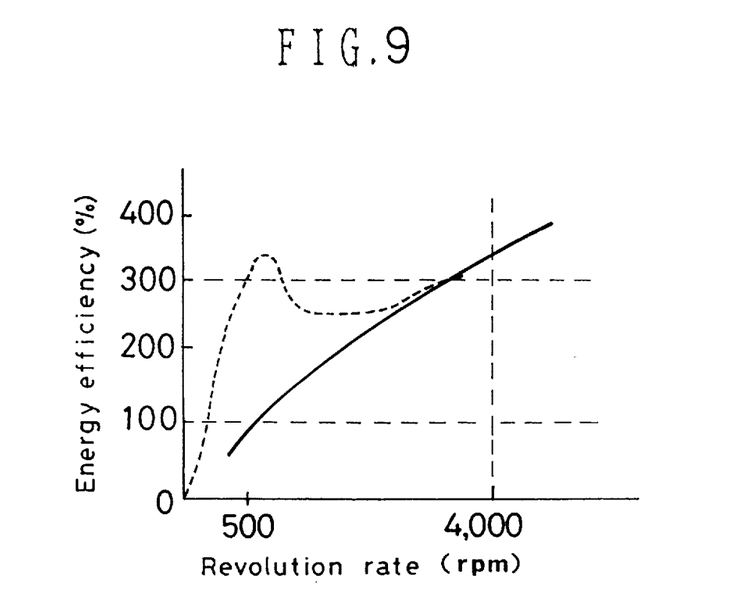
FIG. 9 is a graph showing the relationship between the motor efficiency and the rate of revolution of the rotor in which the induction coil circuit is out of tuning (solid curve) or tuned at a rotor revolution rate of 800 r.p.m. with the variable condenser (dotted curve).

FIG. 9 is a graph showing the relationship between the motor efficiency and the revolution rate of the rotor when the field coil circuit is tuned to an induction current frequency at a revolution rate of the rotor 2 of about 800 r.p.m., in which the dotted curve corresponds to the case where the condenser 16 is omitted and the solid curve corresponds to the case where the tuning condenser 16 is inserted.

According to an experiment performed using the power-generating motor described above, the driving of the motor and the storage of the electric power continued surprisigly for a period as long as one month, by supplying the motor only with the starting power input.

I claim:

1. A power-generating electric motor comprising:
   a rotor;
   said rotor including:
      at least two magnet poles;
      an armature disposed coaxially relative to said rotor, said armature and said rotor defining therebetween an air gap;
   said armature including:
      a suitable number of field cores;
   each field core of said field cores including:
      a field coil;
      a brushless control circuit;
   the motor further including:
      a high $BH_{max}$ permanent magnet disposed inside each magnet pole of said magnet poles of said rotor;
      said high $BH_{max}$ permanent magnet having a duplex structure composed of an inner layer of Co—Fe—Y and an outer layer of Fe—Nd—B; and
      an induction coil disposed adjacent each of said field coils of said armature for the generation of electric power.

2. A power-generating electric motor as claimed in claim 1, wherein each magnet pole of said rotor defines a ridge, said ridge having a canal which extends almost over an entire width of said ridge;
   said high $BH_{max}$ permanent magnet being disposed in said canal of said ridge so as to extend almost over the entire width of said ridge.

3. A power-generating electric motor as claimed in claim 1, wherein each magnet pole of the rotor defines a ridge; said ridge having a side and an outer circumference;
   said circumference including:
      an arc surface part; and
      a plane surface part extending from said arc surface part to said side of said ridge.

4. A power-generating electric motor as claimed in claim 1, wherein said high $BH_{max}$ permanent magnet is of flat configuration.

5. A power-generating electric motor as claimed in claim 1, wherein the $BH_{max}$ value of the high $BH_{max}$ permanent magnet is at least 50 MGOe.

6. A power-generating electric motor as claimed in claim 1, wherein the $BH_{max}$ value of the high $BH_{max}$ permanent magnet is at least 100 MGOe.

7. A power-generating electric motor as claimed in claim 1, wherein the permeance coefficient of the high $BH_{max}$ permanent magnet is 1.0 to 4.0.

8. A power-generating electric motor as claimed in claim 1, wherein the permeance coefficient of the high $BH_{max}$ permanent magnet is 2.5 to 3.5.

9. A power-generating electric motor comprising:
   a rotor;
   an armature disposed coaxially with the rotor with an air gap therebetween and comprising a suitable number of field cores provided each with a field coil; and
   a brushless control circuit;
   said motor comprising:
      a high $BH_{max}$ permanent magnet disposed inside each magnet pole of the rotor; and
      an induction coil for an electric power generation disposed adjacent each of the field coils of the armature; and
      said high $BH_{max}$ permanent magnet having a duplex structure composed of an inner layer of Co—Fe—Y and an outer layer of Fe—Nd—B.

10. A power-generating electric motor as claimed in claim 1, further including:
    a further high $BH_{max}$ permanent magnet disposed inside each field core of said number of field cores of said armature.

11. A power-generating electric motor as claimed in claim 1, further including:
    an induction coil circuit;
    a condenser connected in parallel to said induction coil for tuning an induction current frequency at a lower revolution rate of said rotor.

12. An electric motor comprising:
    a rotor;
    an armature disposed coaxially relative to said rotor such that said rotor and said armature define therebetween an air gap,
    said armature including:
       a suitable number of field cores;
       a field coil associated with each field core of said field cores; and
       a brushless control circuit;
    the motor including:
       a high $BH_{max}$ permanent magnet disposed inside each magnet pole of said rotor;
       said high $BH_{max}$ permanent magnet having a duplex structure composed of an inner layer of Co—Fe—Y and an outer layer of Fe—Nd—B.

13. An electric motor as claimed in claim 12, wherein each magnet pole of said rotor defines a ridge, said ridge having a canal which extends almost over an entire width of said ridge;

said high $BH_{max}$ permanent magnet being disposed in said canal of said ridge so as to extend almost over the entire width of said ridge.

14. An electric motor as claimed in claim 12, wherein each magnet pole of said rotor is formed as a ridge having a side and an outer circumference; said outer circumference of said ridge defining an arc surface part and a plane surface part; said plane surface part extending from said arc surface part to said side of said ridge.

* * * * *